(12) United States Patent
Elkins et al.

(10) Patent No.: US 8,565,978 B2
(45) Date of Patent: Oct. 22, 2013

(54) STEERING WHEEL MOTION AND SELF-CANCELLING TURN SIGNAL SENSOR

(75) Inventors: Scott A. Elkins, Plainfield, IL (US); Ian A. R. McLaren, Chicago, IL (US); Peter J. Dix, Naperville, IL (US); Mark D. Klassen, Lockport, IL (US); Jerry L. Brinkley, Woodridge, IL (US)

(73) Assignee: CNH America LLC

( * ) Notice: Subject to any disclaimer, the term of this patent is extended or adjusted under 35 U.S.C. 154(b) by 189 days.

(21) Appl. No.: 12/915,855

(22) Filed: Oct. 29, 2010

(65) Prior Publication Data

US 2012/0109463 A1  May 3, 2012

(51) Int. Cl.
 *G06F 7/10* (2006.01)
(52) U.S. Cl.
 USPC ............... 701/41; 701/42; 701/43; 701/44
(58) Field of Classification Search
 USPC .................................... 701/41, 42, 43, 44
 See application file for complete search history.

(56) References Cited

U.S. PATENT DOCUMENTS

| | | | |
|---|---|---|---|
| 4,131,772 A | 12/1978 | Weckenmann et al. | |
| 4,155,417 A | 5/1979 | Ziems | |
| 4,530,414 A | 7/1985 | Fukino et al. | |
| 4,638,290 A | 1/1987 | Wagner | |
| 5,200,747 A | 4/1993 | Betz et al. | |
| 5,528,218 A | 6/1996 | Rigsby | |
| 5,610,815 A | 3/1997 | Gudat et al. | |
| 6,198,397 B1 | 3/2001 | Angert et al. | |
| 6,198,992 B1 | 3/2001 | Winslow | |
| 6,201,388 B1 * | 3/2001 | Pecheny et al. | 324/207.2 |
| 6,246,232 B1 * | 6/2001 | Okumura | 324/207.2 |
| 6,314,348 B1 | 11/2001 | Winslow | |
| 6,356,189 B1 | 3/2002 | Fujimaki | |
| 6,487,500 B2 | 11/2002 | Lemelson et al. | |
| 6,868,317 B2 | 3/2005 | Okuyama | |
| 6,894,487 B2 * | 5/2005 | Kunz-Vizenetz | 324/207.25 |
| 7,119,672 B2 | 10/2006 | Subbaraman | |
| 7,159,688 B2 * | 1/2007 | Onizuka et al. | 180/444 |
| 7,236,907 B2 | 6/2007 | Kaster et al. | |
| 7,349,779 B2 | 3/2008 | Nelson | |
| 7,408,455 B2 | 8/2008 | Ponziani | |
| 7,420,363 B2 * | 9/2008 | Hatanaka et al. | 324/207.25 |
| 7,427,858 B2 * | 9/2008 | Akutsu et al. | 324/202 |
| 7,589,522 B2 * | 9/2009 | Knecht et al. | 324/207.21 |
| 7,969,147 B2 * | 6/2011 | Hatanaka et al. | 324/207.25 |
| 8,004,277 B2 * | 8/2011 | Patil et al. | 324/207.25 |
| 2005/0094159 A1 | 5/2005 | Su | |
| 2006/0282205 A1 | 12/2006 | Lange | |

(Continued)

*Primary Examiner* — Bhavesh V Amin
(74) *Attorney, Agent, or Firm* — Sue C. Watson

(57) ABSTRACT

A steering wheel movement sensing apparatus for an agricultural vehicle comprising a magnetic ring configured to fit around the steering column such that it turns in unison with the steering wheel. The minimum number of magnetic poles on the ring is not defined, but a ring having at least 36 poles enables the movement sensor to detect steering wheel movement of 10 degrees. At least two hall-effect sensors fixed in a stationary position adjacent to the magnetic ring generate signals of fluctuating value as the magnetic poles pass enabling wheel movement and the extent of wheel movement to be derived. By specifically adjusting the position of the hall-effect sensors in relation to each other, the resultant output signals can also be used to determine the direction of movement of the steering wheel. Outputs from the sensing apparatus can be used to disengage an automated vehicle guidance system upon detection of steering wheel movement and to provide input to a self-cancelling turn signal system.

6 Claims, 3 Drawing Sheets

(56) References Cited

U.S. PATENT DOCUMENTS

| | | |
|---|---|---|
| 2008/0164991 A1 | 7/2008 | Shimizu et al. |
| 2008/0189012 A1 | 8/2008 | Kaufmann |
| 2008/0224445 A1 | 9/2008 | Viaud et al. |
| 2009/0076673 A1 | 3/2009 | Brabec |
| 2009/0174540 A1 | 7/2009 | Smith |

* cited by examiner

STEERING WHEEL MOTION AND SELF-CANCELLING TURN SIGNAL SENSOR

BACKGROUND OF THE INVENTION

The present invention relates generally to GPS-based vehicle guidance systems used in agricultural applications and more particularly to a method for using a single steering wheel motion input sensor to initiate multiple actions on the vehicle.

Tractors and other off-road work vehicles in the agricultural, mining and construction industries are increasingly equipped with satellite-based guidance (GPS) systems to efficiently control movement over an area. For safety purposes these systems must have an easily-operated manual override capability. The most common is to disengage the GPS whenever the operator takes control of the steering wheel, such as needed to avoid an obstacle in the vehicle path or to turn the vehicle around at the end of a row. The conventional method for detecting steering wheel movement for GPS manual override is through hydraulic sensing of the steering circuit. These methods are costly and have limited accuracy. Activating the manual override requires greater effort when the vehicle is cold than when warm. Hydraulic seal leakage can allow slow steering wheel movement to go undetected which could leave the GPS inadvertently engaged.

Another aspect of the tractors and other off-road work vehicles which require steering wheel motion detection is the automatic cancellation of turn indication signals. An operator initiates a turn signal using an on-board turn indicator switch, causing the signal to flash during the turning sequence. A series of reed switches and a simple 3-pole magnetic ring mounted on a steering shaft are conventionally used to sense the change in steering wheel position to signal the completion of a turn. While the system is well-proven, it has limited accuracy due to the limited number of magnetic poles.

It would be a great advantage to provide a single steering wheel movement detection apparatus capable of providing steering wheel movement signals to multiple systems and apparatus on the vehicle thereby reducing the spatial requirements for a sensor on the steering column. Additional benefits would be realized by a sensing apparatus capable of detecting not only steering wheel movement, but simultaneously detecting changes in the direction of steering wheel movement would provide necessary input for a broad range of vehicle navigational and control functions. Further advantages would be realized if the apparatus could provide increased accuracy over the multiple sensors that it replaces. Still further advantages would be realized if the sensing apparatus could be economically produced at significantly lower costs that the multiple sensors it replaces. These and other advantages are provided by the method and vehicle guidance system described below.

SUMMARY OF THE INVENTION

Accordingly, the present invention, in any of the embodiments described herein, may provide one or more of the following advantages:

It is an object of the present invention to provide a vehicle with a means of detecting, steering wheel movement and steering wheel direction change simultaneously using a sensor contained in a single housing.

It is another object of the present invention to provide a steering wheel movement sensor having sufficiently sensitivity to function as a manual override sensor for a GPS-based vehicle guidance system.

It is another object of the present invention to provide a steering wheel movement sensor that can provide suitable input for a turn signal self-cancellation system.

It is a further object of the present invention to provide a steering wheel movement sensor that can be integrated with on-board electronic control systems thereby eliminating mechanical and hydraulic interfaces.

It is a further object of the present invention to provide a steering wheel movement sensing apparatus that provides a reliable output signal thereby reducing spurious signals.

It is a still further object of the present invention to provide a steering wheel movement sensing apparatus that is sufficiently sensitive to detect small wheel movement or rapid wheel movement so that proper system responses can be reliably initiated.

It is a still further object of the present invention to provide a steering wheel movement sensing apparatus that is durable in construction, inexpensive of manufacture, carefree of maintenance, easily assembled, and simple and effective to use.

These and other objects are achieved by providing a steering wheel movement sensing apparatus comprising a magnetic ring configured to fit around the steering column such that it turns in unison with the steering wheel. The minimum number of magnetic poles on the ring is not defined, but a ring having at least 36 poles enables the movement sensor to detect steering wheel movement of 10 degrees. At least two hall-effect sensors fixed in a stationary position adjacent to the magnetic ring generate signals of fluctuating value as the magnetic poles pass enabling wheel movement and the extent of wheel movement to be derived. By specifically adjusting the position of the hall-effect sensors in relation to each other, the resultant output signals can also be used to determine the direction of movement of the steering wheel. Outputs from the sensing apparatus can be used to disengage an automated vehicle guidance system upon detection of steering wheel movement and to provide input to a self-cancelling turn signal system

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Agricultural guidance systems are increasingly featured in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. These systems interface with the vehicle steering hydraulics to provide the guidance system a means to steer the vehicle. It is common for the systems to monitor manual steering inputs using this same hydraulic system interface in order to detect a manual override by the vehicle operator, such as turning the steering wheel to avoid an obstacle, and disengage the automatic guidance system.

Figure 1:
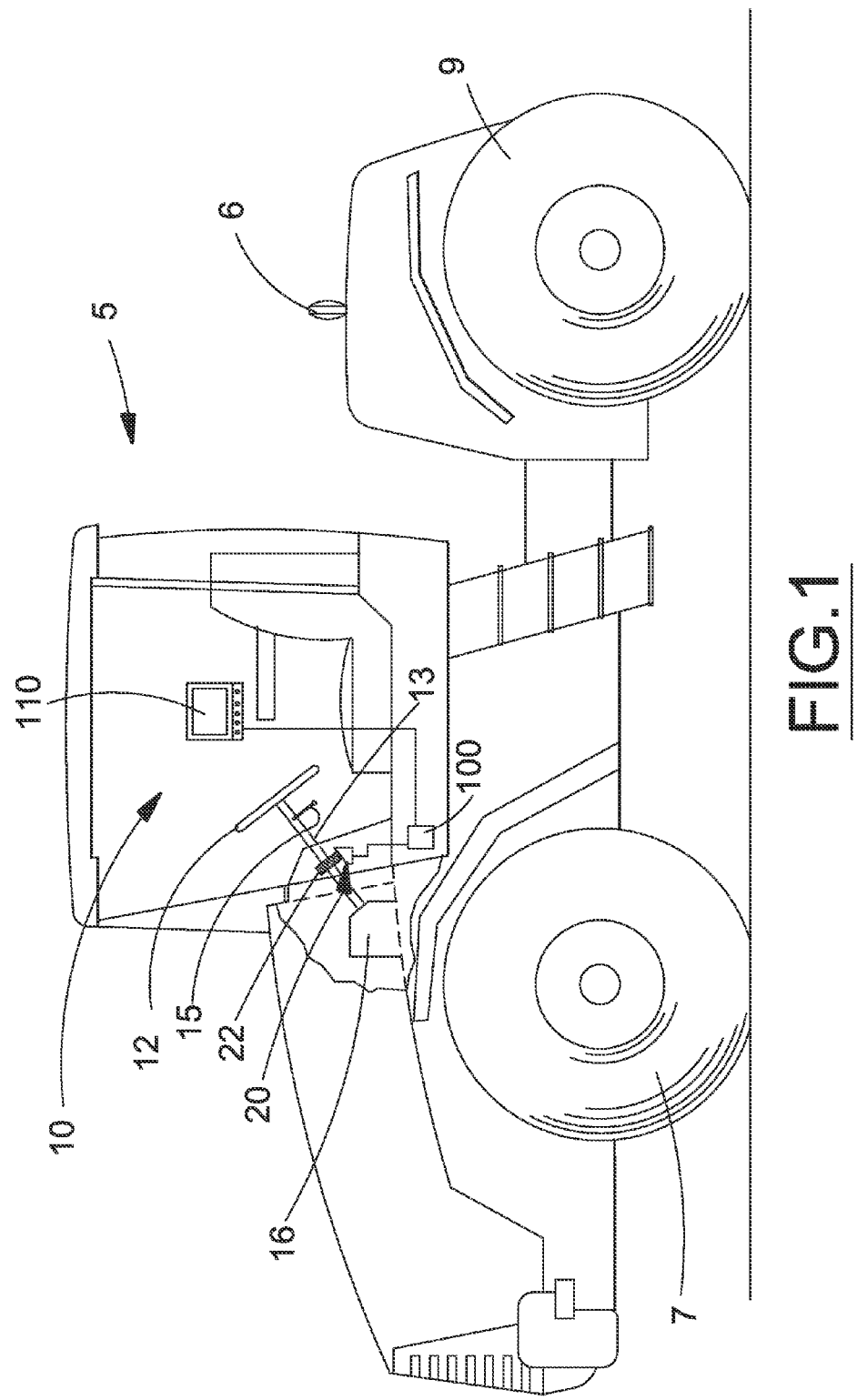
FIG. 1 shows a simplified depiction of a typical tractor or similar off-road work vehicle of the type the present invention is useful showing the layout of the operator's cab.

Referring to FIG. 1 wherein a tractor 5 of the type commonly used in agricultural and construction operations is presented. Such tractors 5 commonly feature a GPS-based vehicle guidance system 100 to simplify the task of driving the vehicle in specific patterns over large expanses of ground. The tractor comprises and operator cab 10 having a steering wheel 12 connected by a steering column 13 to a steering unit 16 for controlling the direction of travel by angling the front wheels 7 or the front and rear wheels 9 in combination. The steering unit 16 may include proportional or directional control valves that are hydraulically connected to a steering actuator for the tractor. The vehicle guidance system 100 continually calculates a vehicle steering heading by comparing vehicle position and directional heading to a desired travel path and sends the vehicle steering heading to the steering unit 16, which in turn actuates vehicle steering (i.e., steered wheels), thereby changing the vehicle heading. The vehicle guidance system 100 may further include other sensors, such as vehicle yaw and roll, implement hitch angle, and the like, which would also be communicatively coupled to the guidance system and adjust the vehicle position signal to compensate for such vehicle movements. An operator console 110 connected to the vehicle guidance system 100 enables output display to the operator as well as the means to receive operator inputs into the guidance system.

The present invention incorporates a steering sensing apparatus 20, which preferably includes a steering sensor 22 coupled to the steering column 13 so that movement of the steering wheel 12 and column 13 may be detected by the sensing apparatus 20 and communicated to the vehicle guidance system 100. Detection of steering wheel movement is necessary to allow a vehicle operator to easily disengage the guidance system by simply turning the steering wheel 12, such as to avoid an obstacle in the vehicle's path. Monitoring motion of the steering column is the most direct method for detecting steering wheel movement. The steering sensing apparatus 20 and its interface with the vehicle guidance system 100 is discussed in greater detail hereinafter.

Tractor 5, is also equipped with directional indicators 6 (only one shown) for use when the vehicle is traveling on public roadways. Indicators 6 are located on the tractor in a manner to be visible from ahead of or behind the tractor and generally positioned adjacent to the sides to indicate the planned direction of a turn when activated. Indicators 6 are typically activated by a directional control switch 15 located adjacent to the steering wheel 12. Conventionally, a mechanical device interacting with steering column 13 automatically deactivates an activated signal 6 once the turn has been completed as the steering wheel is being returned to a straight-ahead position, common referred to as a self-cancelling turn signal mechanism. Using the steering sensing apparatus 20 of the present invention enables the turn signal self-cancelling feature to be accomplished without the need for a separate steering column mounted mechanical device thereby simplifying the steering assembly.

Figure 2:
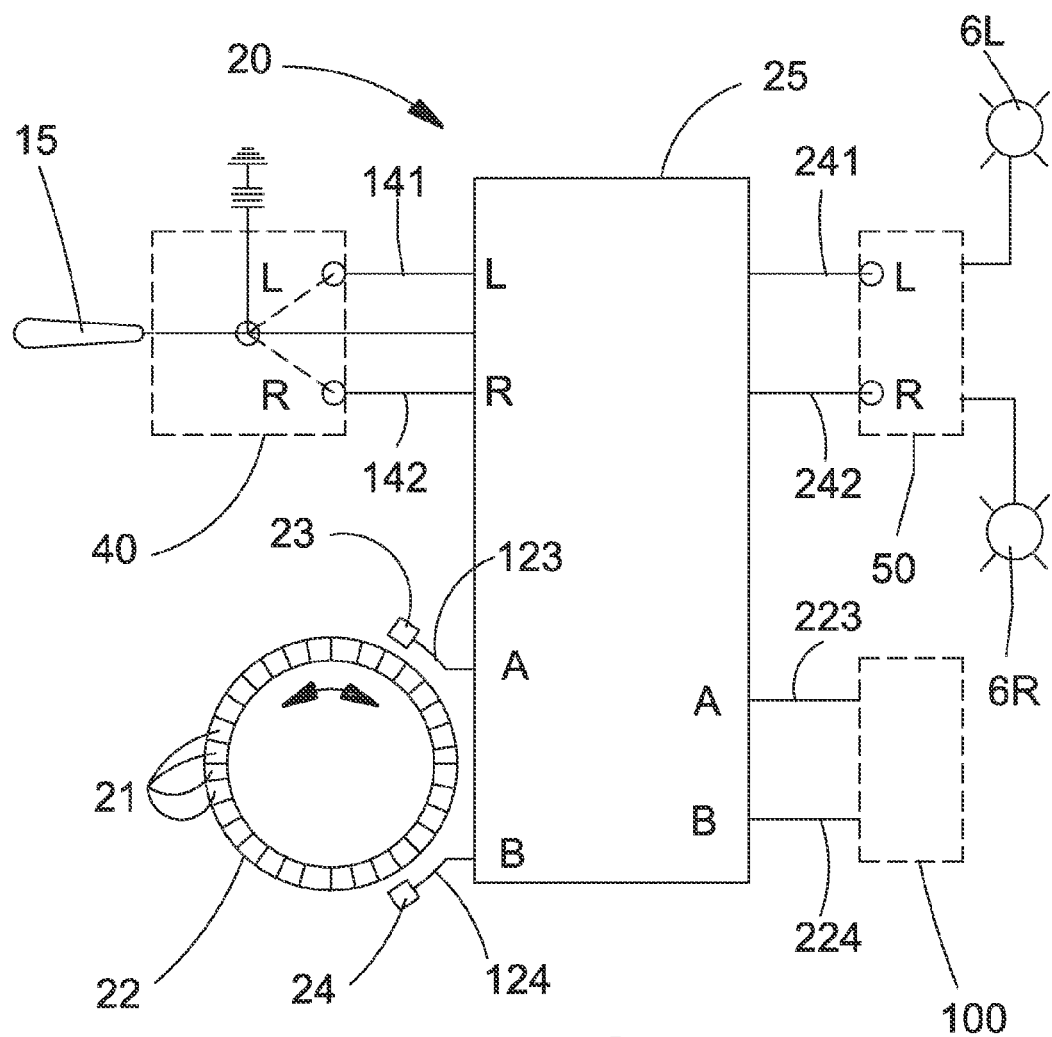
FIG. 2 illustrates a simplified schematic diagrammatic diagram of one embodiment of the steering sensing apparatus of the present invention.

Referring now to FIG. 2, the steering sensing apparatus 20 is shown having processor module 25 and a steering input sensor module 22 configured to detect rotation of the steering column. Steering input sensor module 22 is comprised a plurality of magnetic poles 21 configured in a circular arrangement and a pair of magnetic sensors 23, 24, preferably hall-effect sensors, positioned in the steering sensing apparatus 20 adjacent to the outer periphery of the steering sensor 22. Steering sensor module 22 is preferably connected to the steering column 13 by fitting the magnetic poles 21 around the steering column 12 and securing so that they turn in unison with turning of the steering wheel 12. A pair of magnetic sensors 23, 24, preferably hall-effect sensors, is stationarily positioned in the steering input sensor module 22 adjacent to the outer periphery of the magnetic poles 21. As the steering wheel 12 is turned, the magnetic sensors 23, 24 will detect the passing of the rotating magnetic poles 21 thereby causing variations in the sensor 23, 24 output signals 123, 124. The output signals 123, 124 from the magnetic sensors 23, 24 are received by the processor module 25 which generates appropriate output signals in response. Processor module 25 is preferably a digital electronic controller capable of executing a series of pre-programmed actions based upon input signals received to derive desired output signals.

Figure 3:
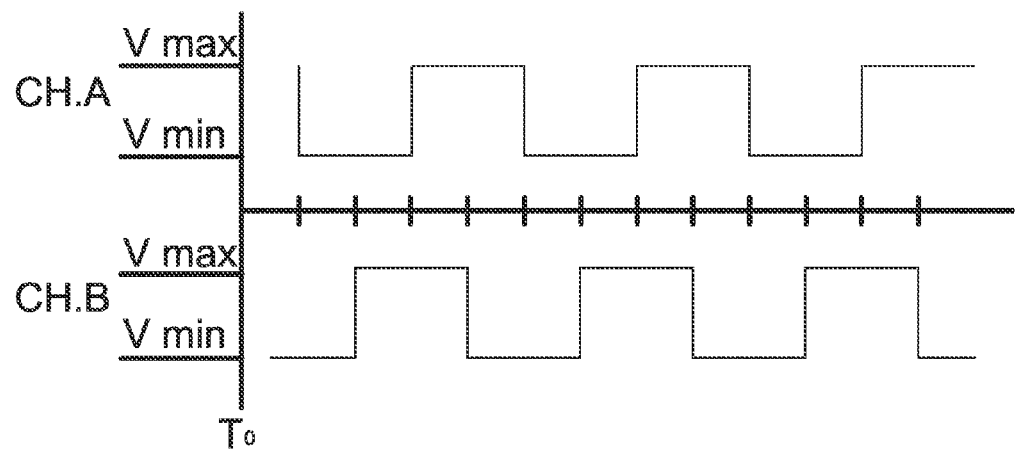
FIG. 3 provides a diagram of the raw output signals used in the steering sensing apparatus to allow fault tolerance and determination of direction of steering wheel rotation in a first direction.
Figure 4:
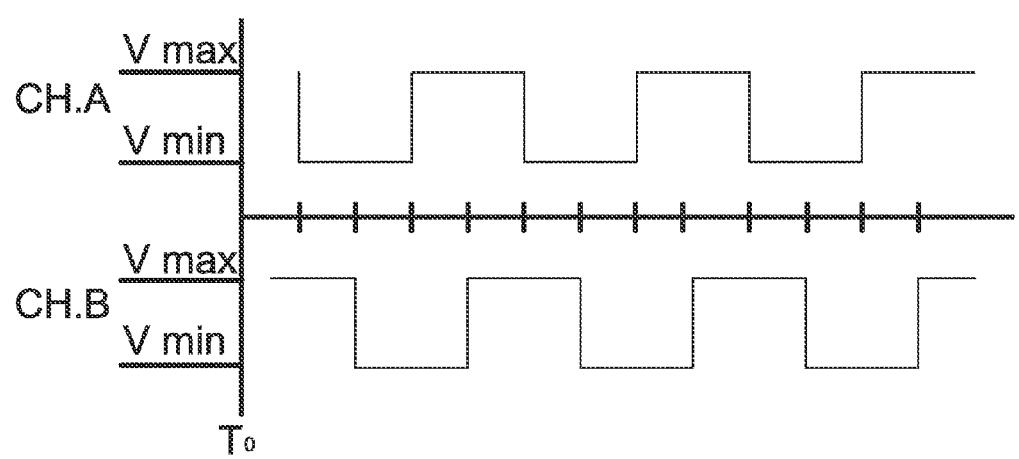
FIG. 4 provides a diagram of the raw output signals used in the steering sensing apparatus showing steering wheel rotation in a direction opposite of the first direction.

The sensors 23, 24 and magnetic poles 21 are positioned such that the resultant output signals are offset square waves (out of phase), shown in FIGS. 3 and 4. A quadrature shift of 90 degrees may be used thereby allowing not only steering wheel rotation to be detected, but the direction of steering wheel rotation. FIG. 3 shows the output signals as the steering wheel is turned in the counter-clockwise direction while FIG. 4 shows the signals as the steering wheel is rated in the clockwise direction. In one embodiment, each individual signal varies between 0.25 volts ($V_{min}$) and 4.75 volts ($V_{max}$). The range of signal values from magnetic sensors 23, 24 is selected to allow processor 25 to provide system fault detection in instances of open or short circuit faults. The number of magnetic poles may be varied; greater accuracy is obtained with an increased number of poles. It is preferred to have at least 36 poles in the sensor such that steering wheel movement of 10 degrees will be detected. It is also preferred that the number of poles be less than or equal to 50 to sensing of each individual pole by magnetic sensors 23, 24. As used herein, magnetic poles includes structures having magnetic polarity, changes in which may be sensed, or structures configured to vary separation from the sensors as the poles 21 rotate, such as gear teeth, that will causes variations in the output signals of the hall-effect sensors based on proximity.

Processor module 25 of the steering sensing apparatus 20 is operably connected to vehicle guidance system 100 by at least guidance override signals 223, 224. Upon receipt of the guidance override signals, vehicle guidance system is disengaged if it is engaged at the time to provide a manual operator override capability. Processor module 25 receives raw magnetic sensor output signals 123, 124 as Channel A (from magnetic sensor 23) and Channel B (from magnetic sensor 24) inputs. The offset signals allow the processor module 25 to differentiate between actual steering wheel movement and noise or vibration in the signals. Signal jitter can occur when an edge of a magnetic pole is positioned directly adjacent to one of the magnetic sensors. In such instances, slight movement of the steering wheel causes the output signal 123 or 124 to cycle between the $V_{min}$ and $V_{max}$ values. As the steering wheel 12 is rotated, processor module 25 is configured to require changes in both the A and B channels before guidance override signals 223, 224 are initiated thereby minimizing the risk of spurious signals that would result from monitoring only one magnetic sensor. Incorporating this spurious signal protection arrangement prevents the steering sensing apparatus 20 from sending false signals to the vehicle guidance system, the turn signal system, or any other system receiving steering wheel movement input from the apparatus 20. Since the vehicle guidance system is configured to disengage upon sensing of only steering wheel movement, no additional processing of the steering sensing signals is necessary by the processor module 25.

The sampling rate of magnetic sensor output signals 123, 124 by the processor module 25 must also be sufficiently fast to detect rapid steering wheel movement, such as would occur when the vehicle operator is trying to quickly avoid an obstacle in the vehicle travel path. A minimum sampling rate of 3 Hz (corresponding to 3 steering wheel revolutions per second) is preferred as experience studies show this is greater than the most aggressive turning rate. Any electronic controller utilizing the manual override signals (vehicle guidance system or other) should be capable of accepting and reacting to inputs of at least this input frequency.

Steering sensing apparatus 20 is also operably connected to the turn signaling apparatus for tractor 5. Turn signals 6L and 6R are initially activated by directional control switch 14 via turn inputs 141, 142 to begin directional indication by flashing turn signal 6L or 6R. Processor module 25 generates a signal generates flasher signals 241, 242, as appropriate, and communicates these to flasher module 50. Flasher module 50 receives flasher signals 241, 242 of 0 volts or 12 volts from processor module 25 and in turn cycles turn signal 6L or 6R between illuminated and non-illuminated states. Processor module 25 also receives steering wheel movement indication from magnetic sensor output signals 123, 124. For turn signal control, processor module 25 monitors variations in the Channel A and Channel B magnetic sensor output signals 123, 124 to determine both the direction and extent of steering wheel rotation. Following turn signal activation, assumed to occur from a generally straight-ahead direction of travel, processor module 25 allows operation of the turn signal as the steering wheel is turned in a first direction (the direction of the turn) until the maximum extent of the turn is sensed, typically occurring when the direction of steering wheel rotation reverses. At this point, the processor module 25 is configured to continue allowing flasher operation until a predetermined amount of steering wheel rotation in the reverse direction is sensed at which point the processor module 25 changes state of the appropriate flasher signals 241 or 242 to cease operation of the turn signal. A predetermined amount of reverse steering wheel rotation ranging between 36 and 44 degrees has been determined to allow for mid-turn corrections without disengaging the turn signal indication yet properly terminate operating of the turn signal indication upon completion of a turn and return to a generally straight-ahead track. Other alternatives may be programmed into the It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A steering sensing apparatus for an agricultural vehicle, the apparatus including:

a sensor module which interacts with a steering system of the vehicle, the steering system including a steering wheel and connected shaft for directionally controlling the vehicle, a guidance system for automating vehicle directional control, and a turn indication, the sensor module detecting rotation of the steering wheel, the sensor module having first and second magnetic sensors and a plurality of magnetic poles, the plurality of magnetic poles generally circularly arranged about the rotatable shaft for rotation therewith, the first and second magnetic sensors disposed generally radially outwardly adjacent to the plurality of magnetic poles and each configured to provide a magnetic sensor signal having a high value or a low value indicative of the presence or absence, respectively, of a magnetic pole adjacent to the sensor, the plurality of magnetic poles and the first and second magnetic sensors being positioned with respect to the plurality of magnetic poles so that the values of the first and second magnetic sensor signals do not change between the high value and the low value simultaneously; and a processor module operably connected to the sensor module, the processor module including a digital microprocessor having a sampling rate to receive the first and the second magnetic sensor signals, and to initiate a first output and a second output in response thereto, the first output being initiated when the first and the second magnetic sensor signals both change value indicating movement of the steering wheel, the second output being initiated when the first and the second magnetic sensor signals cycle between the high and low values in a first pattern indicative of movement of the steering wheel for a turn input in a first direction followed by cycling of the first and the second magnetic sensor signals between the high and low values in a second pattern indicative of movement of the steering wheel in a direction opposite of the first direction for a predetermined amount, wherein the sampling rate is carried out by the processor, configured to detect a steering wheel rotation of at least three revolutions per second.

2. The apparatus of claim 1, wherein the first and the second magnetic sensor signals cycle between the high and low values in a quadrature phase relationship.

3. The apparatus of claim 1, wherein the first and second magnetic sensors are hall-effect sensors.

4. The apparatus of claim 1, wherein the plurality of magnetic poles is at least 36 poles.

5. The apparatus of claim 1, wherein the first output disengages the vehicle guidance system.

6. The apparatus of claim 1, wherein the second output discontinues operation of the turn signal system.

* * * * *